US006572913B2

(12) United States Patent
DeFrancisci et al.

(10) Patent No.: US 6,572,913 B2
(45) Date of Patent: Jun. 3, 2003

(54) CONTINUOUS COOKING METHOD EMPLOYING HYDROSTATIC PRESSURE

(75) Inventors: Leonard DeFrancisci, Vero Beach, FL (US); Leonard J. DeFrancisci, West Melbourne, FL (US)

(73) Assignee: Howden Food Equipment Corp., Melbourne, FL (US)

( * ) Notice: Subject to any disclaimer, the term of this patent is extended or adjusted under 35 U.S.C. 154(b) by 0 days.

(21) Appl. No.: 09/935,270

(22) Filed: Aug. 22, 2001

(65) Prior Publication Data

US 2002/0025365 A1 Feb. 28, 2002

Related U.S. Application Data

(60) Provisional application No. 60/227,561, filed on Aug. 23, 2000.

(51) Int. Cl.$^7$ ................................................. A23L 1/00
(52) U.S. Cl. ....................... 426/523; 426/438; 426/509; 426/510; 426/511
(58) Field of Search .................................. 426/509, 438, 426/523, 510, 511; 99/404, 407, 470

(56) References Cited

U.S. PATENT DOCUMENTS

| 3,614,924 A | 10/1971 | Hickey |
| 3,927,976 A | 12/1975 | Reimers et al. |
| 3,982,481 A | 9/1976 | Console et al. |
| 4,152,975 A | 5/1979 | Jones |
| 4,155,293 A | 5/1979 | Spiel et al. |
| 4,181,072 A | 1/1980 | Hirahara |
| 4,214,013 A | 7/1980 | Hirahara |
| 4,571,341 A | 2/1986 | Sugimura |

(List continued on next page.)

FOREIGN PATENT DOCUMENTS

GB          1 248 629          10/1971

OTHER PUBLICATIONS

The Canning Trade, Inc., A Complete Course in Canning, Library of Congress Catalog Card No: 46–19487, 1981, pp. 297–302, The Canning Trade, Inc., Baltimore, MD.

Casadei, M.A., The Use of High Hydrostatic Pressure in Food Microbiology– A Review, Review No. 21, 2000, pp. 1–54, Campden and Chorleywood Food Research Association, Gloucestershire, UK.

Atherton, D., Process Control in Hydrostatic Cookers Part 1. Validification of Cooker Operating Conditions, Technical Manual No. 5, Nov., 1981, pp. 1–19, Appendix 1 pp. 3, and Appendix 2 (Figs. 1–3), Campden and Chorleywood Food Research Association, Gloucestershire, UK.

(List continued on next page.)

*Primary Examiner*—George C. Yeung
(74) *Attorney, Agent, or Firm*—Allen, Dyer, Doppelt, Milbrath & Gilchrist, P.A.

(57) ABSTRACT

A method for cooking food includes heating a liquid cooking medium in a cooking vessel having a "U"-shaped structure having a height is sufficient, with sufficient medium added, to attain a hydrostatic pressure at a predetermined lower depth that is substantially greater than ambient atmospheric pressure. The food is conveyed through the vessel, mostly cooking at the bottom, where the hydrostatic pressure facilitates a cooking of the food at a rate substantially greater than a rate at ambient pressure. A further aspect of the invention is a method for reducing wastewater output and makeup water usage when cooking a food containing a complex carbohydrate. This method causes released complex carbohydrate to cause a lower viscosity increase than at ambient pressure, thereby increasing a cooking effectiveness of the water and reducing a need for adding makeup water and disposing of wastewater.

23 Claims, 5 Drawing Sheets

U.S. PATENT DOCUMENTS

| | | |
|---|---|---|
| 4,582,047 A | 4/1986 | Williams |
| 4,752,491 A | 6/1988 | D'Alterio et al. |
| 4,754,699 A | 7/1988 | Cope et al. |
| 4,787,300 A | 11/1988 | Mette |
| 4,899,648 A | 2/1990 | Fast |
| 5,052,287 A | 10/1991 | Chiang |
| 5,134,926 A | 8/1992 | De Francisci |
| 5,137,740 A | 8/1992 | Benson et al. |
| 5,167,979 A | 12/1992 | Benson et al. |
| 5,294,452 A | 3/1994 | De Francisci |
| 5,493,956 A | 2/1996 | Larsen |
| 5,546,849 A * | 8/1996 | Shefet .................. 99/470 |
| 5,560,952 A | 10/1996 | Miller et al. |
| 5,619,908 A | 4/1997 | Catelli et al. |
| 5,664,482 A | 9/1997 | Graham et al. |
| 5,824,187 A | 10/1998 | Richter et al. |
| 5,972,407 A | 10/1999 | Hsu |
| 6,058,828 A | 5/2000 | Wei et al. |

OTHER PUBLICATIONS

Austin, G., Process Control in Hydrostatic Cookers Part 3. Guidelines on Emergency Procedures, Technical Manual No. 5, Aug., 1984, pp. 1–23, Campden and Chorleywood Food Research Association, Gloucestershire, UK.

Process Control in Hydrostatic Cookers Part 2. Factors Affecting Heat Penetration Rates, Technical Manual No. 5, Jun., 1984, pp. 1–124, Campden and Chorleywood Food Research Association, Gloucestershire, UK.

Roto Cooker–Coolers, Lyco Product Brochure, Acknowledged Prior Art.

Double–Drum Screens, Lyco Product Brochure, Acknowledged Prior Art.

* cited by examiner

CONTINUOUS COOKING METHOD EMPLOYING HYDROSTATIC PRESSURE

CROSS-REFERENCE TO RELATED APPLICATION

This application claims priority to provisional application Ser. No. 60/227,561, "Continuous Cooking Apparatus and Method Employing Hydrostatic Pressure," filed Aug. 23, 2000.

FIELD OF INVENTION

The present invention relates to the substantially continuous cooking of food products and, in particular, to cooking under hydrostatic pressure of a liquid for improving cooking temperatures and cooking times.

BACKGROUND OF THE INVENTION

Cooking of foods in a heated liquid typically requires the liquid within which the food is being cooked to combine with the food as well as provide a cooking temperature sufficient for completing the cooking process. By way of example, when cooking food products such as pasta, rice, legumes, or vegetables, large amounts of water are absorbed during the cooking process, with the weight of the cooked food generally increasing to 250% of the original dry weight for pasta, for instance. Further, it is known to cook food products within enclosed containers such as cans to provide for cooking under pressure developed within the can. However, the amount of liquid that can be absorbed by the food product is limited to that carried within the can. The cooked food contained within the can and the can are cooled, labeled, packaged, and prepared for delivery to a point of sale. However, while the cooking process may be enhanced by the pressure-style cooking within an enclosed can, it is not practical to remove the cooked food from the can for further preparation such as in a frozen entree. As a result, cooking within a can has typically only been used when no subsequent food preparation process is needed or desired.

Continuous cooking processes are known in the art. For example, Spiel et al. (U.S. Pat. No. 4,155,293 disclose cooking under atmospheric pressure in hot water to hydrate the food. Hickey (U.S. Pat. No. 3,614,924) teaches a conveyor and discharge chute for conveying a food product through a cooking bath comprising cooking fat. Williams (U.S. Pat. No. 4,582,047) discloses a high-humidity steam cooker including a continuously running conveyor for processing large volumes of food products passed through an energy-efficient steam cooker that preserves the product's humidity, flavor, and appearance with water temperatures disclosed at essentially atmospheric pressures. Mette (U.S. Pat. No. 4,787,300) teaches an apparatus for continuously cooking and dehydrating foodstuffs, the apparatus including a multizone installation for preheating, boiling, and recooling through which the foodstuffs are passed. Larsen (U.S. Pat. No. 5,493,956) discloses a tank apparatus having movable rollers for receiving a pasta strand and routing the strand around rollers, including floatable rollers, for passing the pasta strand through the water bath to an exit conveyor. Depending on the blanching time required, movable rollers are repositioned to a desired elevation within the tank for blanching or cooking the pasta as it is transported through the water within the tank. D'Alterio et al. (U.S. Pat. No. 4,752,491) disclose the cooking of pasta ribbons on a zigzag conveyor passing through water carried within a tank.

SUMMARY OF THE INVENTION

It is an object of the present invention to provide an apparatus and method for cooking a foodstuff in a fluid cooking medium.

It is also an object to provide such an apparatus and method for reducing cooking time.

It is an additional object to provide such an apparatus and method that achieve a substantially continuous cooking process.

It is a further object to provide such an apparatus that has a smaller footprint than known previously in the art.

It is another object to provide such an apparatus and method that permit the absorption of cooking medium into the foodstuff.

An additional object is to provide such an apparatus and method that requires less cooking medium.

A further object is to provide such an apparatus and method that reduces a production of waste fluid.

Another object is to provide such an apparatus and method that reduces an amount of added "makeup" cooking fluid and waste fluid.

It is yet an additional object is to provide such an apparatus and method that assist in reducing potential microbial contamination.

It is yet a further object to provide such an apparatus and method for improving a quality of the cooked foodstuff.

It is yet another object to provide an apparatus and method for sterilization.

These and other objects are achieved by the present invention, one aspect of which is a method for cooking food. The method comprises the steps of heating a liquid cooking medium in a cooking vessel. The vessel has an open top, a bottom, and a wall having a vertical height. The height is sufficient, and there is sufficient medium added, so as to attain a hydrostatic pressure in the cooking medium at a predetermined lower depth that is substantially greater than ambient atmospheric pressure.

The next step comprises downwardly conveying food to be cooked from an entry area at a surface of the cooking medium to the lower depth. The hydrostatic pressure thus facilitates a cooking of the food at a rate substantially greater than a rate at ambient pressure.

Another aspect of the present invention is for enhancing a food cooking process using increased hydrostatic pressure. The method comprises the steps of placing a predetermined quantity of food into a container and conveying the container on a pathway having a downward component through a heated cooking medium. The heated cooking medium has a sufficient depth so as to increase hydrostatic pressure along the column to at least about 1.25 atmospheres, that is, 0.25 atmospheres above ambient pressure at sea level. In order to obtain such a pressure level at sea level, for example, a pathway would comprise at least 4–5 feet downward.

Yet another aspect of the present invention is an apparatus for cooking food that comprises a cooking vessel as above. Means are also provided for heating the cooking medium and for downwardly conveying food to be cooked from an entry area along the predetermined level to the lower depth. As above, this is for permitting the hydrostatic pressure to facilitate cooking the food at a rate substantially greater than a rate at ambient pressure.

A further aspect of the present invention is a method for reducing wastewater output and makeup water usage by a cooking process for a food comprising a complex carbohydrate. This method comprises the steps of heating water in a cooking vessel as above and downwardly conveying the food to be cooked to the lower depth, also as above. This method further causes released complex carbohydrate from the cooking food to cause a lower viscosity increase than a viscosity increase at ambient pressure, thereby increasing a cooking effectiveness of the water and reducing a need for adding makeup water and disposing of wastewater. In addition, the more rapid cooking times of the present invention also decrease complex carbohydrate leaching from the food being cooked, again increasing cooking effectiveness and reducing a need for adding makeup water and wastewater disposal.

BRIEF DESCRIPTION OF DRAWING

Embodiments of the invention are described, by way of example, with reference to the accompanying drawings in which.

DETAILED DESCRIPTION OF THE PREFERRED EMBODIMENTS

The present invention will now be described more fully with reference to FIGS. 1–9. This invention may be embodied in many different forms and should not be construed as limited to the embodiments set forth herein. Rather, these embodiments are provided to convey a scope of the invention to those skilled in the art.

Figure 1:
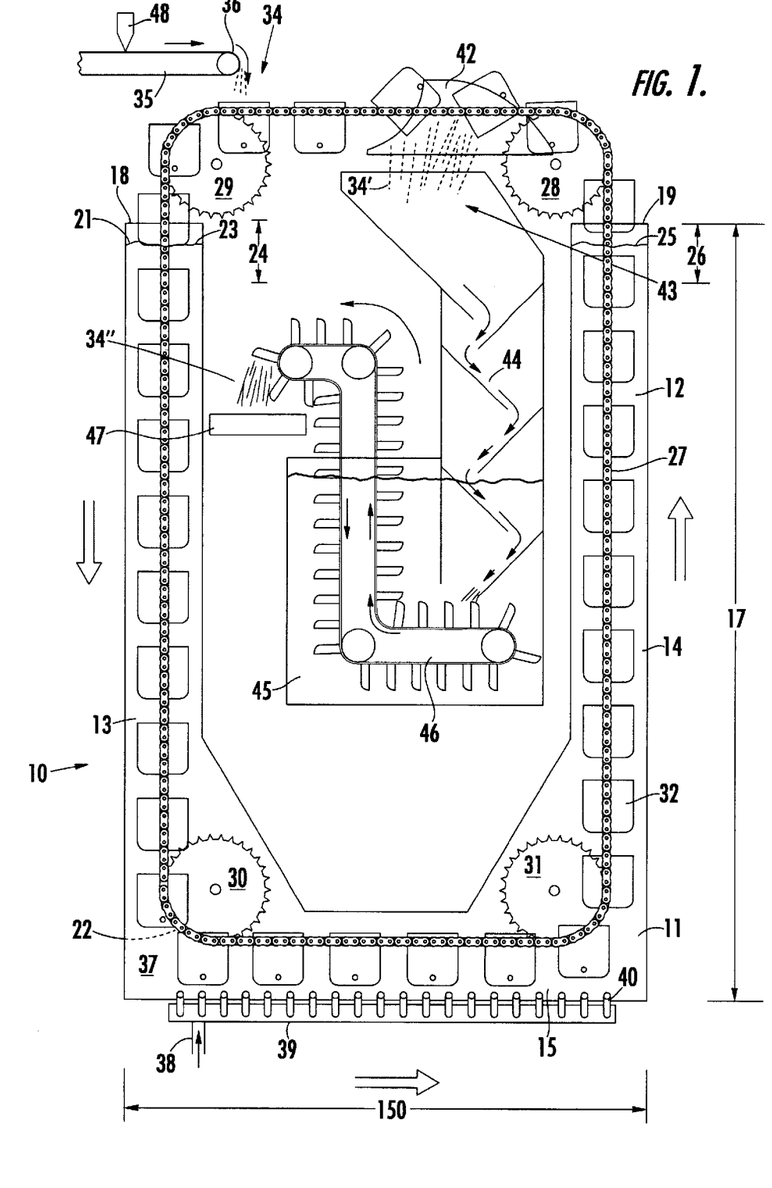
FIG. 1 is a partial cross-sectional side elevational view of a first embodiment of the present invention.
Figure 2:
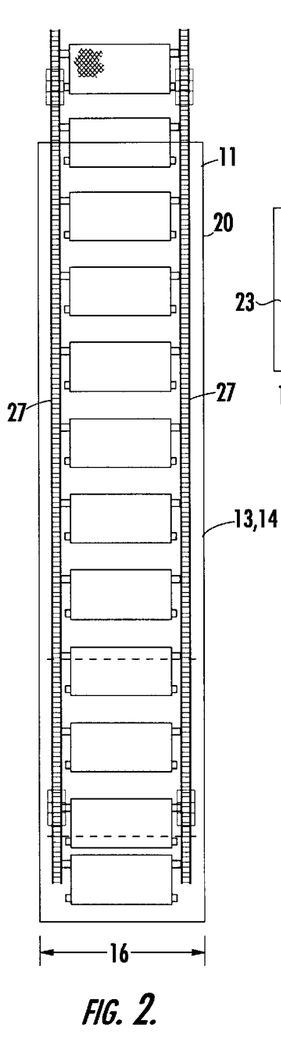
FIG. 2 is a partial cross-sectional end view of a cooking container portion of FIG. 1.
Figure 3:
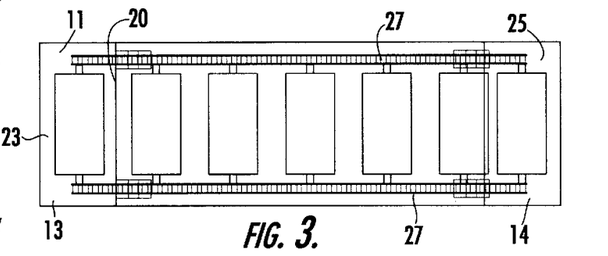
FIG. 3 is a partial top view of FIG. 1.

As illustrated with reference to FIGS. 1–4B, one embodiment 10 of the apparatus of the present invention includes a cooking vessel 11 having a generally "U"-shaped cross section for holding a column of cooking medium, such as, but not intended to be limited to, water 12. The cooking vessel 11 has two separate vertical columns 13,14, each of which extends upwardly from and is in fluid communication with a common bottom leg 15. The vessel 11 has a length 150, a width 16, and a vertical height 17. Each column 13,14 also has an open top 18,19 and a substantially rectangular enclosing wall 20 (FIGS. 2 and 3). The height 17 is sufficient for holding the cooking liquid, such as water, 12 to a predetermined level 21 for attaining a hydrostatic pressure in the water 12 at a predetermined lower depth 22 in the vessel 11. As stated above, the hydrostatic pressure is substantially greater than ambient atmospheric pressure, and is typically in a range of 1.25–2.0 atmospheres, that is, 0.25–1 atmosphere above the ambient pressure at sea level. The vertical height 17, which in a preferred embodiment would comprise a range of approximately 8–30 feet at sea level, provides increased pressure with increasing water depth and thus an increased temperature at the bottom portion of the vessel 11 is possible resulting from the columns 13,14 of water 12 above the bottom leg 15.

An entry area 23 is along a top sector 24 of the first vertical column 13, and an exit area 25 is along a top sector 26 of the second vertical column 14. The entry 23 and exit 25 areas are for the entry and exit of a conveyor for downwardly and upwardly conveying the food to be cooked to and from the lower depth 22. The conveyor comprises in a preferred embodiment a pair of parallel sprocket chains 27 engageable at each of four corners by sprockets 28–31, one of which 28 comprises the drive sprocket. The chains 27 form a continuous loop through the first column 13, the bottom leg 15, the second column 14, and across the space between the columns 13,14.

A plurality of containers 32 (FIGS. 4A and 4B) are affixed for free rotation in spaced relation from each other via a pivot 33 on each side attachable to the chains 27. Each container 32 is adapted to hold a discrete quantity of the food 34 to be cooked therein. Each container 32 comprises a perforated metal basket in a preferred embodiment. The pivotability about pivot 33 permits that, when the chains 27 rotate about the closed loop, the containers 32 always remain substantially upright unless affected by a force in another direction, not unlike a Ferris wheel.

As shown in FIG. 1, food to be cooked 34, such as, for example, pasta for blanching, is delivered to the apparatus 10 via a conveyor belt 35 that terminates at a location 36 above the conveyor. As a container 32 goes by the conveyor belt 35 at discrete intervals, a mechanism such as is known in the art is provided for coordinating an activation of the belt 35 when a container 32 is beneath the belt 35, with gravity permitting the food 34 to drop from the belt 35 into a container 32. The speed of sprocket rotation is preferably variable, for adjusting cooking time depending upon such factors as type of food to be cooked, cooking medium, and ambient altitude.

The water 12 is heated with a steam injector in fluid communication with an interior 37 of the vessel 11 along the vessel bottom leg 15. The steam injector in this embodiment comprises a steam inlet 38 and a steam manifold 39 having a plurality of steam nozzles 40. The steam manifold 39 is in fluid communication with the steam inlet 38. This is not intended as a limitation, as other heating methods may well be envisioned by one of skill in the art, such as, but not intended to be limited to, electrical resistance-type heat production (see, for example, FIG. 7). It will also be obvious to one of skill in the art that the heating means need not necessarily be at the bottom leg 15, and that they may be positioned anywhere along the water column, although at or adjacent the bottom leg 15 is believed to represent a preferred embodiment.

Figure 4A:
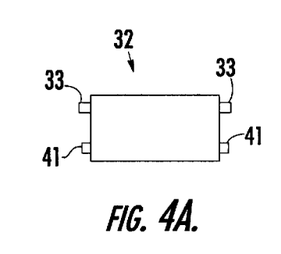
FIGS. 4A and 4B are partial side and end views of a food basket of FIG. 1.
Figure 4B:
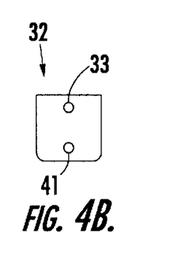

Means are also provided for cooling the cooked food 34' and for transferring food 34' from the containers 32 to the cooling system. As shown in FIGS. 4A and 4B, each container 32 also has on each side a second pivot 41. As the container emerges from the exit area 25 and rounds the corner at sprocket 28, the second pivot 41 is engaged by a lifting arm 42, which tilts the container 32 to empty the cooked food 34' into a chute 43, which in turn leads via a serpentine pathway 44 to a cooling water bath 45. Another conveyor belt 46 takes the cooled food 34" out of the bath 45 and drops it onto an outbound conveyor 47, which leads, for example, to a packaging area.

It may also be desired to pretreat the food 34 to be cooked with steam prior to entry into the vessel 11, which is represented in FIG. 1 by nozzle 48.

One feature of the present invention includes cooking of the food within free water as opposed to within closed containers such as the cans earlier described. For the present invention, cooking includes not only heating the food, but allowing it to absorb the free liquid to combine with the food being cooked and complete the cooking process as desired. As described, products such as pasta absorb large amounts of water during cooking, and typically such foods as pasta can increase in weight by approximately 250%.

As illustrated with reference to FIGS. 5–8, alternate embodiments 10', 10'', 10''', 10'''' of the apparatus described are presented with reference to FIGS. 1–4B, wherein like elements are indicated by the same reference numeral with the commensurate number of primes.

A second embodiment 10' (FIG. 5) includes an arcuate-shaped bottom section 15' for the vessel 11' with the cooling bath 45' delivering cooked food product 34' that has settled to the bottom of the cooling bath 45' to a water lock for discharging onto the discharge conveyor 47'.

Figure 5:
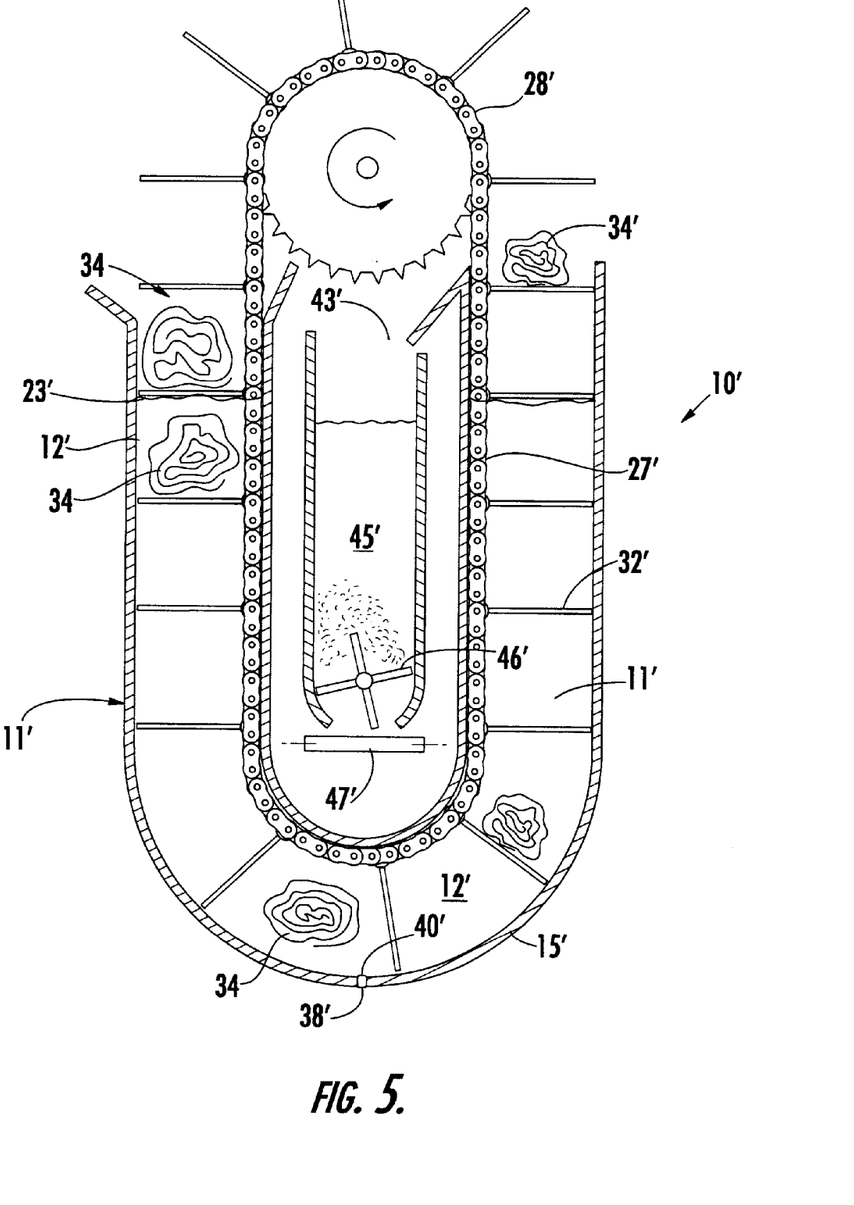
FIG. 5 is a partial cross-sectional elevation view of a second embodiment of the present invention.
Figure 6:
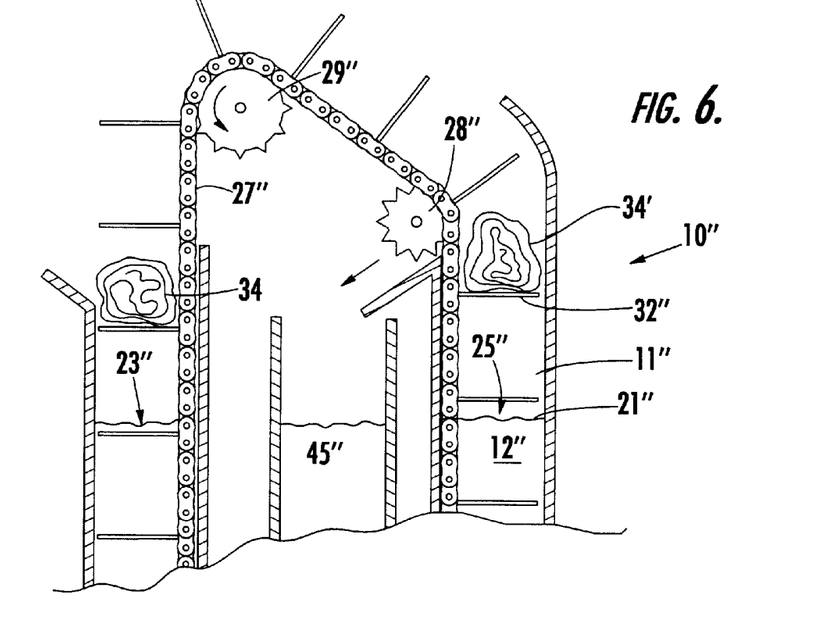
FIG. 6 is a partial cross-sectional elevation view of an alternate conveyor mechanism of the present invention for transferring cooked product to a cooling section.
Figure 7:
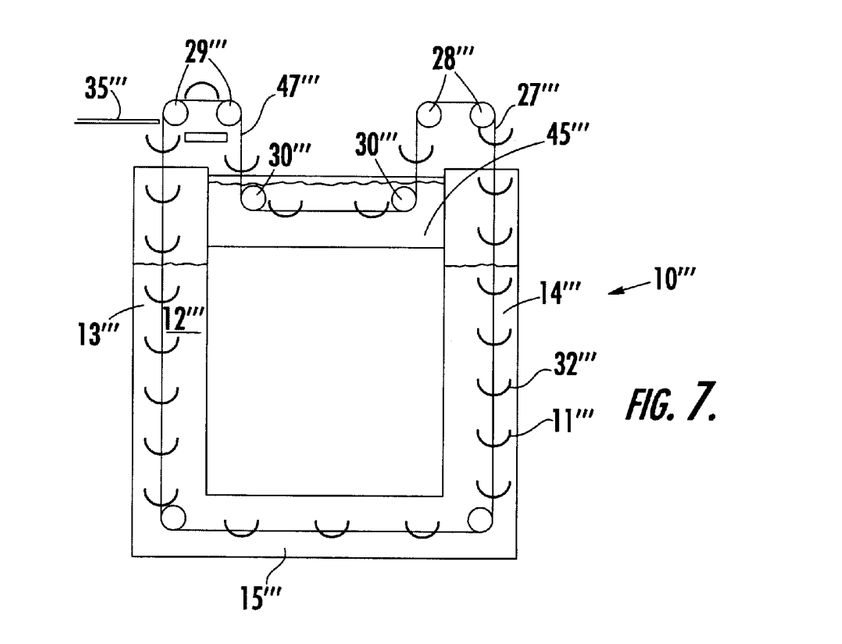
FIG. 7 is a partial cross-sectional elevation view of a third embodiment of the present invention.
Figure 8:
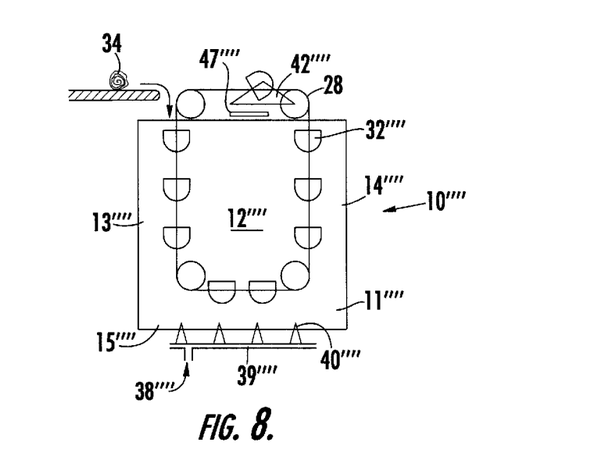
FIG. 8 is a partial cross-sectional side elevational view of a fourth embodiment of the present invention.
Figure 9:
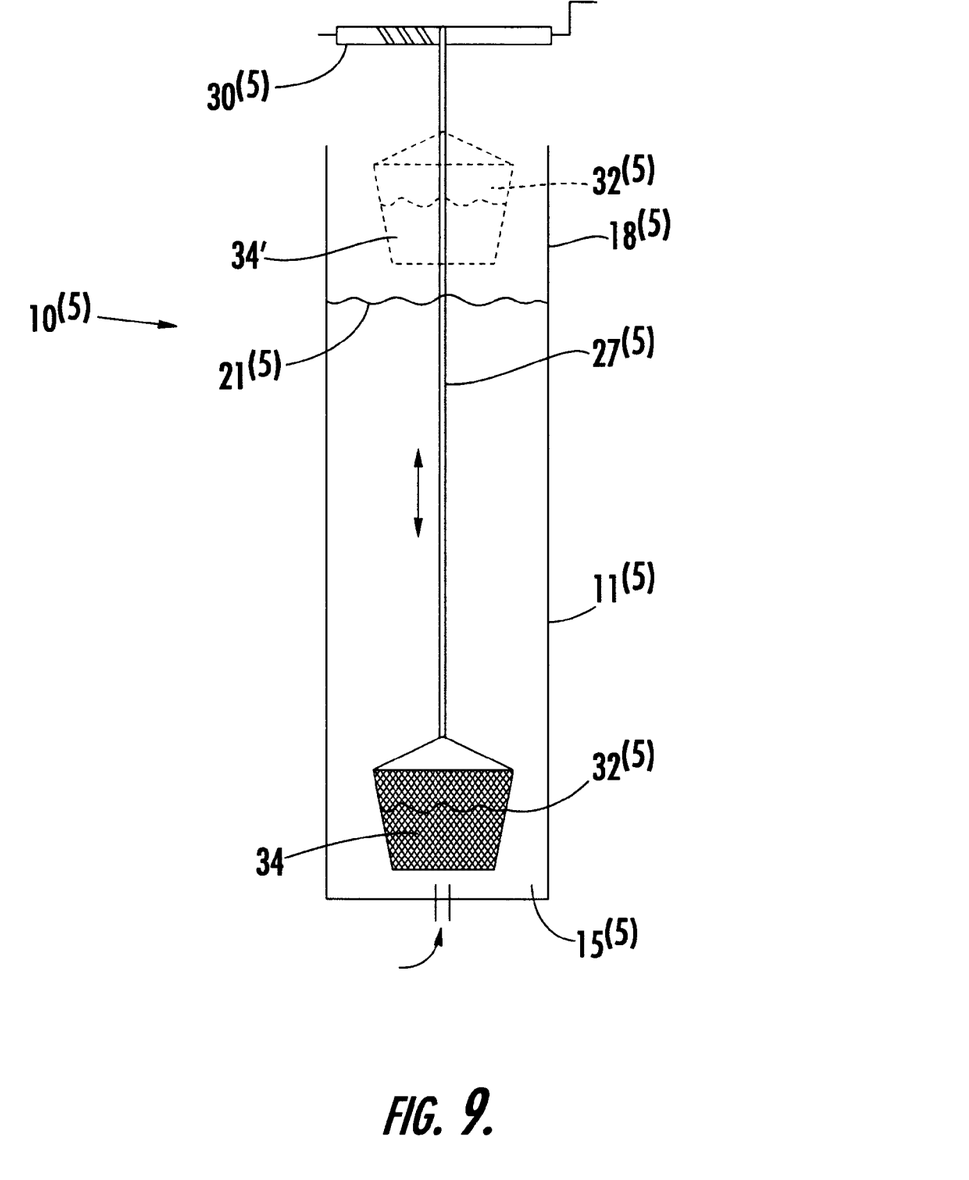
FIG. 9 is a cross-sectional side elevational view of a fifth embodiment of the present invention.

In the embodiments of FIGS. 5 and 6, the food 34,34' is carried on substantially flat carriers 32',32'' that are carried by a chain 27',27'' and disgorge the cooked food 34' when the carrier 32',32'' is tilted upon proceeding toward the top of a unitary sprocket 28' in the case of FIG. 5 and a first of a pair of sprockets 28'',29'' in the case of FIG. 6.

Yet a further embodiment includes the cooling bath 45', 45'',45''' carried at various locations (FIGS. 5 and 6) or integrally formed (FIG. 7) within a housing that includes the vessel 11''' and the cooling bath 45'''. In the embodiment 45''' of FIG. 7, three pairs of sprockets 28'''–30''' are required to maintain a level attitude of the carriers 32''' through the water bath 45''' after exiting the second column 14'''.

In an additional embodiment 10'''' (FIG. 8), the vessel comprises a unitary, substantially rectangular cooking vessel 11'''', the chains 27'''' and containers 32'''' traveling along the sides 13'''',14'''' and bottom 15'''' for cooking, and disgorged in like manner to the first embodiment 10, the movement of the output conveyor 47'''' in this case perpendicular to the plane of the drawing.

A fifth embodiment $10^{(5)}$ (FIG. 9) comprises a substantially rectangular cooking vessel $11^{(5)}$ comprising a unitary tower. A flexible carrying member such as a wire or chain $27^{(5)}$ carrying at least one container $32^{(5)}$ is affixed to a vertical transport means, which may comprise, for example, a mechanism such as a mechanical crank $30^{(5)}$, not unlike a well and bucket arrangement, for lowering and raising the container $32^{(5)}$ to and from a cooking level adjacent the bottom $15^{(5)}$ of the vessel $11^{(5)}$. In this embodiment $10^{(5)}$ the food to be cooked would be placed into the container $32^{(5)}$, lowered to the vessel bottom $15^{(5)}$, where it would remain for a time sufficient to achieve a desired cooking level, and then raised (shown as a dotted container $32^{(5)}$) to the vessel top $18^{(5)}$, where the cooked food 34' may then be post-treated as desired.

The apparatus herein described with reference to the attached drawings are directed for use in blanching and cooking foods such as pasta, rice, beans, meat, and vegetables in a cooking fluid, such as water or oil, and cooking and cooling such foods within cooling baths if desired. However, it will be appreciated by one skilled in the art that the hydrostatic cooking herein described by way of example for the present invention may include cooking other foods within other liquids or other mixtures without departing from the intent and teachings of the invention.

In operation, and by way of example with reference to cooking of pasta, with an approximately 15-foot-high container, there is approximately one-half an atmosphere increase in pressure that can be used to achieve cooking temperatures of 224° F., 12° F. above the normal boiling point of water. With such, pasta will cook in 30% less time. Depending on the shapes of the pasta, the reduction in cooking time will be from 10 to 7 minutes with no breakage of the pasta due to handling and minimal starch loss in the cooking water. If the container is increased in height to approximately 30 feet, the pressure increase is close to one atmosphere and results in temperatures of approximately 240° F. With such an increase in temperature, the cooking time for the pasta is reduced by 50% of the normal cooking time while including similar benefits. The apparatus of the present invention may additionally be used for noncooking applications such as a continuous autoclave for sterilization of items such as medical implements or for pasteurization of food that does not require cooking.

The present invention permits food products to be cooked at temperatures higher than normal boiling point temperatures (212° F.) by cooking under hydrostatic pressure higher than atmospheric pressure typically used for the continuous cooking and conveying of pasta. The food cooks faster, is more efficiently cooked, and in certain cases retains and/or enhances desirable properties of the food products that can be degraded by longer cooking times.

The present invention permits continuous cooking of food products in large quantities of free liquid such that the food is in direct contact with a cooking fluid bath rather than being enclosed in a vessel for pressure cooking, such as a can. Further, water can be added as desired/needed during the cooking process. The hydrostatic column of water generates sufficient pressure increases to enhance the cooking process while permitting the continuous processing of the food from an input side to an exit side which are at atmospheric pressure. No pressure locks or pressure vessels, as defined by ASTME Codes, are required.

As earlier described with reference to the attached drawings, the apparatus of the present invention conveys food through the cooking fluid in containers made of perforated metal or other porous material. Preferably the material in contact with cooking fluid comprises food-quality stainless steel, although this is not intended as a limitation. This provides gentle treatment of the food, which prevents damage to delicate food products. A conveying mechanism for the basket may be a bucket elevator mechanism, by way of example. The bucket may be enclosed, if desired, to prevent food from escaping, which top can be opened during the loading and unloading of the food product from the cooking cycle. The "U"-shaped design, herein described for a preferred embodiment, occupies a very small amount of floor space (footprint), which is desirable in a food plant that typically has available vertical space, but limited floor space. Again, as herein described, a cooling section can be placed within the "U"-shaped space.

Because of the decreased cooking time and higher temperatures achieved, a reduction in the starch leaching into the cooking water can be achieved, and the starch that does escape from the food is less viscous in the cooking water, making the cooking process more efficient. Suspended starches cause loss in weight and throughput of food product and cause significant cost for wastewater treatment of the processing water. Because of the "U"-shaped design herein described, the amount of water used for processing and cleaning is significantly reduced in comparison to conventional cookers and blanchers, which use vat-styled containers. The efficient cooking process, as well as the efficient use of floor space, are desirable features made available by embodiments of the present invention, and are believed to confer significant environmental benefit. Further, the increased pressure and temperature experienced by the food assist in a reduction of microbial contamination, thereby improving sanitization and sterilization of the food. Pretreatment with steam is also believed to confer a toughening of the product, so that an effect of starch in the cooking water is not as deleterious, nor is as much starch released by the cooking food. In addition, the increased pressure conferred by the present invention is useful in "locking in" beneficial food characteristics such as nutrients and flavor.

Many modifications and other embodiments of the invention will come to the mind of one skilled in the art having the benefit of the teachings presented in the foregoing description and drawings. Therefore, it is to be understood that the invention is not to be limited to the specific embodiments disclosed.

What is claimed is:

1. A method for cooking food comprising the steps of:
   heating a liquid cooking medium in a cooking vessel having an open top, a bottom, and a wall having a vertical height, the height sufficient and sufficient medium added so as to attain a hydrostatic pressure in the cooking medium at a predetermined lower depth, the hydrostatic pressure substantially greater than ambient atmospheric pressure;
   pretreating food to be cooked with steam;
   placing a discrete quantity of the steam-pretreated food into a container affixed to a conveyer extending through the cooking medium from an entry area at a surface of the cooking medium to the lower depth;
   moving the container downward by moving the conveyer, the hydrostatic pressure facilitating a cooking of the food at a rate substantially greater than a rate at ambient pressure;
   upwardly conveying the cooked food in the container through the cooking medium to an exit area at a surface of the cooking medium;
   emptying the container of the cooked food; and
   returning the emptied container from the exit area to the entry area.

2. The method recited in claim 1, further comprising controlling a rate of the downwardly and the upwardly conveying steps commensurate with a required cooking time of the food.

3. The method recited in claim 1, further comprising the step of cooling the cooked food following the upwardly conveying step.

4. The method recited in claim 1, wherein the exit area is in spaced relation from the entry area.

5. The method recited in claim 1, wherein the vessel comprises an enclosure having a substantially rectangular horizontal cross-section.

6. The method recited in claim 1, wherein the vessel comprises a substantially "U"-shaped enclosure comprising two separate vertical columns extending upwardly from and in fluid communication with a common bottom leg, wherein the entry area is along a top sector of a first vertical column and the exit area is along a top sector of a second vertical column.

7. The method recited in claim 1, further comprising the steps of:
   further extending the conveyor from the lower depth to the exit area; and
   wherein the upwardly conveying step comprises continuing to move the container along the conveyor from the lower depth to the exit area.

8. The method recited in claim 7, wherein the entry area is positioned in spaced relation from the exit area, and further comprising the step, between the downwardly and the upwardly conveying steps, of moving the container along the vessel bottom.

9. The method recited in claim 7, wherein the entry area and the exit area are substantially collocated, and further comprising the step, between the downwardly and the upwardly conveying step, of retaining the container adjacent the vessel bottom for a time sufficient for cooking the food.

10. The method recited in claim 7, further comprising the step of continuing to cook the food during the upwardly conveying step.

11. The method recited in claim 1, wherein the container comprises a plurality of containers affixed in spaced relation along the conveyor, and the placing step comprises placing a discrete quantity of the food to be cooked into at least some of the containers.

12. The method recited in claim 1, wherein the heating step comprises at least one of injecting steam into the cooking medium and heating the cooking medium with electrical resistance heating adjacent the vessel bottom.

13. A method for enhancing a food cooking process using increased hydrostatic pressure, the method comprising the steps of:
   pretreating food to be cooked with steam;
   placing a predetermined quantity of the steam-pretreated food into a container;
   conveying the container on a pathway having a downward component through a heated cooking medium, the heated cooking medium having a sufficient depth so as to increase hydrostatic pressure along the pathway to at least about 1.25 atmospheres;
   upwardly conveying the cooked food in the container through the cooking medium to an exit area at a surface of the cooking medium;
   emptying the container of the cooked food; and
   returning the emptied container from the exit area to the entry area.

14. The method recited in claim 13, further comprising the step of enclosing the cooking medium in a generally columnar vessel.

15. The method recited in claim 14, wherein the enclosing step comprises the step of forming the vessel as two separate vertical columns extending upwardly from and in fluid communication with a common bottom leg.

16. The method recited in claim 15, wherein the conveying step comprises the steps of:
   attaching a plurality of containers at spaced intervals along a movable conveyor extending downwardly through a first one of the vessel columns, along the bottom leg, and upwardly through the second vertical column; and
   placing the food to be cooked into at least some of the containers.

17. The method recited in claim 16, wherein the conveyor comprises a continuous loop.

18. The method recited in claim 13, wherein the food comprises a pasta, the cooking medium comprises water, and the hydrostatic pressure comprises at least about 1.25 atmospheres.

19. The method recited in claim 13, wherein the food comprises rice, the cooking medium comprises water, and the hydrostatic pressure comprises at least about 1.25 atmospheres.

20. The method recited in claim 13, wherein the food comprises a legume, the cooking medium comprises water, and the hydrostatic pressure comprises at least about 1.25 atmospheres.

21. The method recited in claim 13, wherein the food comprises a vegetable, the cooking medium comprises water, and the hydrostatic pressure comprises at least about 1.25 atmospheres.

22. The method recited in claim 13, wherein the food comprises a food product desired to be deep fried, the cooking medium comprises an oil, and the hydrostatic pressure comprises at least about 1.25 atmospheres.

23. A method for reducing wastewater output and makeup water usage by a cooking process for a food comprising a starch comprising the steps of:

heating water in a cooking vessel having an open top, a bottom, and a wall having a vertical height, the height sufficient and sufficient medium added so as to attain a hydrostatic pressure in the water at a predetermined lower depth, the hydrostatic pressure substantially greater than ambient atmospheric pressure;

pretreating the food with steam, thereby reducing a deleterious effect of released starch on the cooking water and thereby reducing energy usage and further reducing water usage;

placing a discrete quantity of the steam-pretreated food into a container;

downwardly conveying the container containing the steam-pretreated food from an entry area at a surface of the water to the lower depth, the hydrostatic pressure facilitating a cooking of the food at a rate substantially greater than a rate at ambient pressure and further causing released complex carbohydrate from the cooking food to cause a lower viscosity increase than a viscosity increase at ambient pressure, thereby increasing a cooking effectiveness of the water and reducing a need for adding makeup water and disposing of wastewater;

upwardly conveying the cooked food in the container through the cooking medium to an exit area at a surface of the cooking medium;

emptying the container of the cooked food; and returning the emptied container from the exit area to the entry area.

* * * * *